(12) United States Patent
Sandoval et al.

(10) Patent No.: US 11,455,508 B2
(45) Date of Patent: Sep. 27, 2022

(54) SMART ANTI-THEFT TAG FOR BOOTS

(71) Applicant: Industrial Security Solutions, Corp., Sparks, NV (US)

(72) Inventors: David Michael Sandoval, Huntington Beach, CA (US); Mingjun Hu, Hangzhou (CN)

(73) Assignee: Industrial Security Solutions, Corp., Sparks, NV (US)

( * ) Notice: Subject to any disclaimer, the term of this patent is extended or adjusted under 35 U.S.C. 154(b) by 0 days.

(21) Appl. No.: 17/345,807

(22) Filed: Jun. 11, 2021

(65) Prior Publication Data

US 2022/0180144 A1 Jun. 9, 2022

(30) Foreign Application Priority Data

Dec. 7, 2020 (CN) .......................... 202011414013.5

(51) Int. Cl.
 *G06K 19/077* (2006.01)
(52) U.S. Cl.
 CPC .............................. *G06K 19/07762* (2013.01)
(58) Field of Classification Search
 None
 See application file for complete search history.

(56) References Cited

U.S. PATENT DOCUMENTS

| 7,474,209 | B2 | 1/2009 | Marsilio et al. |
| 8,281,626 | B2 | 10/2012 | Conti et al. |
| 8,890,689 | B2 | 11/2014 | Ezzo et al. |
| 9,245,432 | B2 | 1/2016 | Yang |
| 9,472,073 | B2 | 10/2016 | Yang |
| 2011/0102179 | A1* | 5/2011 | Ezzo ................... E05B 73/0041 340/568.1 |
| 2014/0104061 | A1* | 4/2014 | Luo ..................... E05B 73/0017 340/572.8 |

\* cited by examiner

*Primary Examiner* — Kristy A Haupt
(74) *Attorney, Agent, or Firm* — Sheppard, Mullin, Richter & Hampton LLP (57) ABSTRACT

Embodiments described herein relate to an anti-theft device for commodities, and aims to provide a smart anti-theft tag for boots. The tag can effectively prevent boots from being stolen and is reliable in performance, exquisite in structure and easy to use. According to the technical solution, the smart anti-theft tag for boots comprises a tag holder provided with a circuit board, a sounder component, a coil and a battery, and a hoop assembly movably mounted on the tag holder to be tied on and connected to a heel of a boot, a bolt assembly movably located in the tag holder and used for unidirectional control of the movement of the hoop assembly, and a lock assembly movably located in the tag holder and used to lock the bolt assembly in a moving state.

13 Claims, 10 Drawing Sheets

SMART ANTI-THEFT TAG FOR BOOTS

CROSS-REFERENCE TO RELATED APPLICATIONS

This application claims priority to Chinese Patent Application No. 202011414013.5, filed on Dec. 7, 2020, which is herein incorporated by reference for all purposes.

TECHNICAL FIELD

The invention relates to an anti-theft device for commodities, in particular to a smart anti-theft tag for boots.

BACKGROUND

Boots, as high-end shoes, are very popular with young consumers because of their unique style. Due to the existing self-service sales model and the high price of the boots, sales markets have to put a great deal of effort for management to prevent the boots from being damaged or stolen. At present, anti-theft tags for commodities have been widely used in the markets, but no anti-theft tag special for boots is available yet. If the existing anti-theft tags are used to prevent the boots from being stolen, a desired effect cannot be realized. Thus, those skilled in the art expect to design an anti-theft tag special for boots.

BRIEF SUMMARY OF EMBODIMENTS

The objective is to overcome the defects mentioned in the background to provide a smart anti-theft tag for boots. The smart anti-theft tag can effectively prevent boots from being stolen and is reliable in performance, exquisite in structure, and easy to use.

In some embodiments, a smart anti-theft tag for boots may comprise a tag holder provided with a circuit board, a sounder component, a coil and a battery, a hoop assembly movably mounted on the tag holder to be tied on and connected to a heel of a boot, a bolt assembly movably located in the tag holder and used for unidirectional control of movement of the hoop assembly, and a lock assembly movably located in the tag holder and used to lock the bolt assembly in a moving state.

The hoop assembly comprises a high rack and a low rack which are configured correspondingly and provided with racks, a square cable fitting the contour of the heel of the boot and connected to the two racks through two connectors, and a tension gear rotatably located in the tag holder and engaged and matched with the two racks.

The tension gear is a duplex gear located in the tag holder in a manner of rotating around the axis and connected to a knob, and toothed ends of the high gear and the low gear stretch into the tag holder via holes formed in two sides of the tag holder and are engaged with the duplex gear.

The bolt assembly comprises a lock tooth movably located in the tag holder and having a bottom end engaged with a large gear of the duplex gear, and a bolt movably located in the tag holder and applying a force to the lock tooth by means of a lock tooth spring; a moving direction of the lock tooth is parallel to a moving direction of the bolt.

The lock assembly comprises a plug seat located on the tag holder, a cylinder movably located in the plug seat, and a plug spring located in the plug seat and applying a force to the cylinder to enable the cylinder to be matched with the bolt; and a moving direction of the cylinder is perpendicular to the moving direction of the bolt.

The tag holder comprises a bottom base and a surface base are connected together and define a cavity, and a concave surface fitting a rear upper of the boot is arranged on a side, facing the boot, of the bottom base.

A detection element for detecting whether or not the tag is separated from the boot is further arranged in the tag holder, and a detection hole is formed in the concave surface to allow a detection light or a detection ray to pass through.

A contact switch to be in contact fit with the bolt is arranged on the circuit board.

In some examples, the tag is unlocked, the square cable on the tag holder is tied around the heel of the boot, and then, the knob is screwed to enable the two racks to tension the square cable; after that, the bolt is pushed downwards, and the detection element on the circuit board is started at the moment the bolt is locked by the cylinder, so that the tag is assembled on the boot. If someone takes the boot away without permission, an access control system at the door of a market will be triggered by the coil in the tag and make alarm sounds. If someone intends to untie the tag from the boot, the detection element will immediately detect that the tag is separated from the boot, the sounder component in the tag will make alarm sounds to draw the attention of management personnel. Users can unlock the tag by aligning the cylinder to a common magnetic unlocking tool.

The invention has several beneficial effects. For example, the smart anti-theft tag can reliably guarantee the security of commodities; the tag has an exquisite appearance and thus will not affect the attractiveness of the boot; and in addition, the tag can be used easily and can be locked and unlocked extremely conveniently.

DETAILED DESCRIPTION

The illustrated embodiment will be further explained below in conjunction with the accompanying drawings. In the figures: 1, plug cover; 2, fire-proof steel bowl; 3, plug spring; 4, cylinder; 5, knob; 6, surface base; 7, anti-lock buckle; 8, bolt; 9, bolt spring; 10, lock tooth spring; 11, lock tooth; 12, tension gear; 13, gear cover; 14, coil; 15, circuit board; 16, bottom base; 17, battery; 18, battery cover; 20, low rack; 21, high rack; 22, connector; 23, connector cover; 24, square cable.

As shown in the figures, in a smart anti-theft tag for boots, a tag holder is formed by a bottom base 16 and a surface base 6 which are connected together, a circuit board 15 is mounted in a cavity in the tag holder, a battery 17 (e.g., used to supply power to electrical devices), a sounder component (e.g., a buzzer, not shown) and a coil 14 are mounted on the circuit board; a hoop assembly is movably mounted on the tag holder (e.g., the hoop assembly may be mounted on a lower portion of the tag holder, as shown) and can be tied on and connected to a heel of a boot; a bolt assembly is movably located in the tag holder and is used for unidirectional control of the movement of the hoop assembly; and a lock assembly is movably located in the tag holder and is used to lock the bolt assembly in a moving state.

Figure 9:
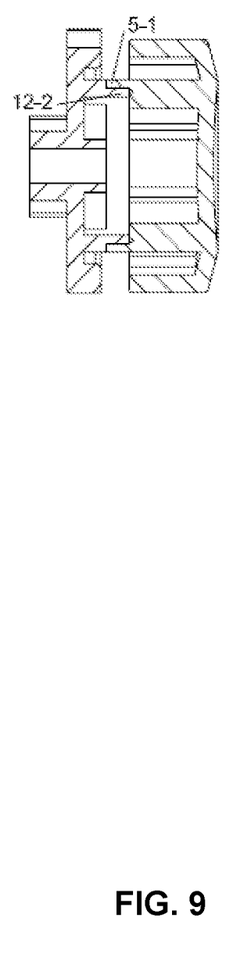
FIG. 9 is an enlarged view of the cooperation of a tension gear and a knob in FIG. 6.
Figure 10:
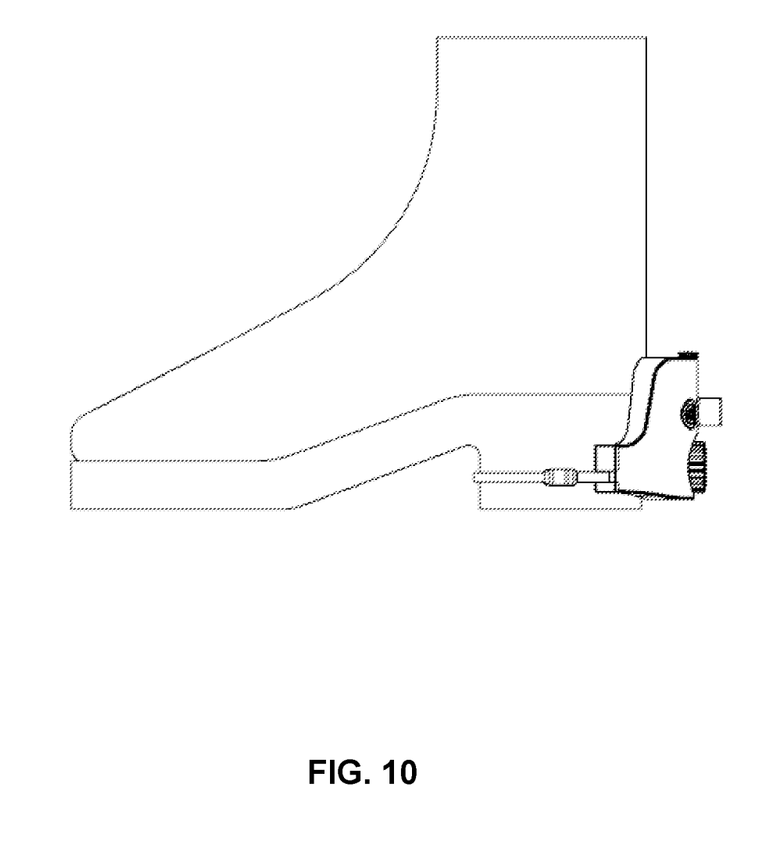
FIG. 10 is schematic diagram of the embodiment of the invention during use.

In the hoop assembly, a high rack 21 and a low rack 20 are configured correspondingly and are provided with racks respectively; a square cable is of a shape matching the contour of the heel of the boot and is connected to the two racks through two connectors 22. In some examples, circumferential grooves 25 are formed in connecting ends of the high and low racks and two ends of the square cables respectively, flanges to be embedded in the grooves are formed on two sides of the connectors respectively, and a connector cover 23 is bonded to the connectors with a binding agent and covers a cavity between the connectors. A tension gear 12 is rotatably located in the tag holder and is engaged and matched with the two racks; the axis of the tension gear is horizontal, a right side of the tension gear is fixed to a knob 5, and a spindle of the tension gear is inserted into a spindle hole of the tag holder (as can be seen from FIG. 9, the tension gear is located in the cavity of the tag holder, and a convex ring 12-2, which is located on an outer surface of the tension gear and protrudes outwards, penetrates through the spindle hole in the surface base to be suspended outside; the knob is located outside the tag holder, and a collar 5-1 protruding towards the convex ring is correspondingly arranged on an end face, towards the convex ring, of the knob; the convex ring and the collar are clamped together through a suitable step surface and are ultrasonically welded into a whole; and a joint part is used as the spindle of the knob and the tension gear to be located in the spindle hole in the surface base), and thus, the knob and the gear rotate will not move in the radial or axial direction when rotating.

Figure 6:
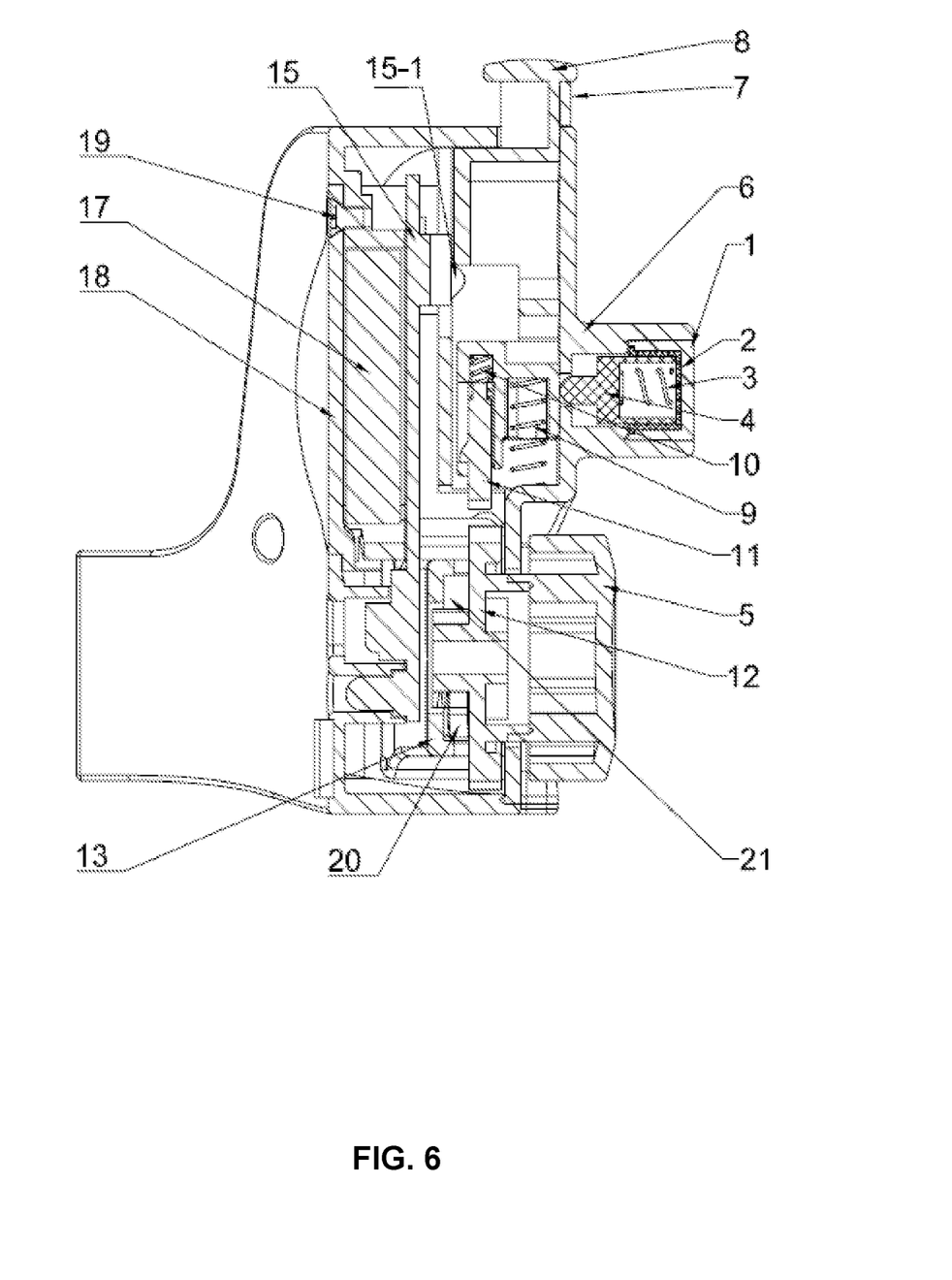
FIG. 6 is an enlarged structural view of a tag holder in FIG. 1.
Figure 7:
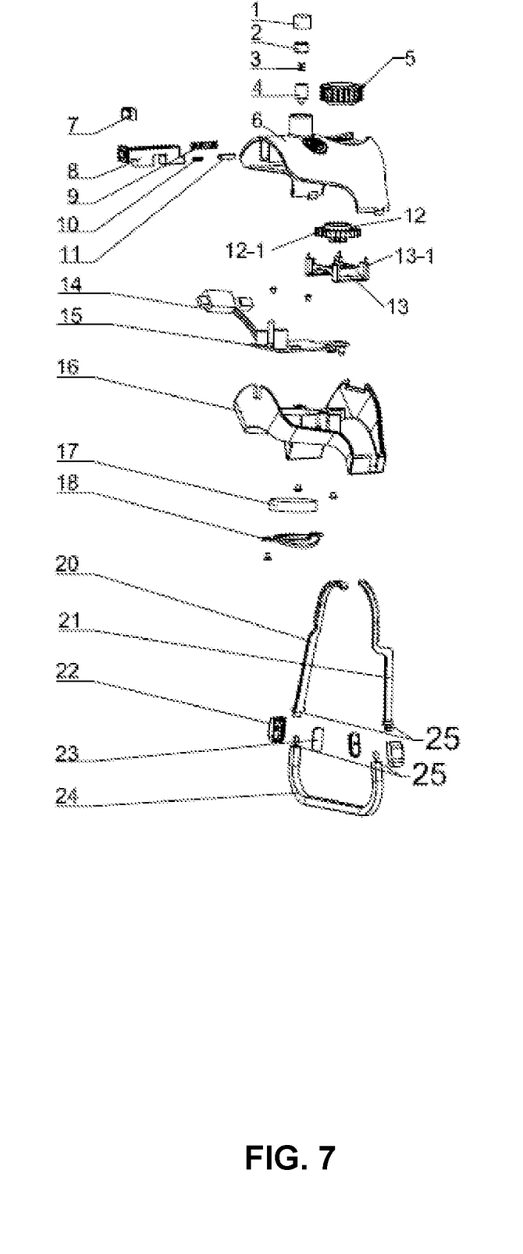
FIG. 7 is an exploded structural view of the embodiment of the invention.
Figure 8:
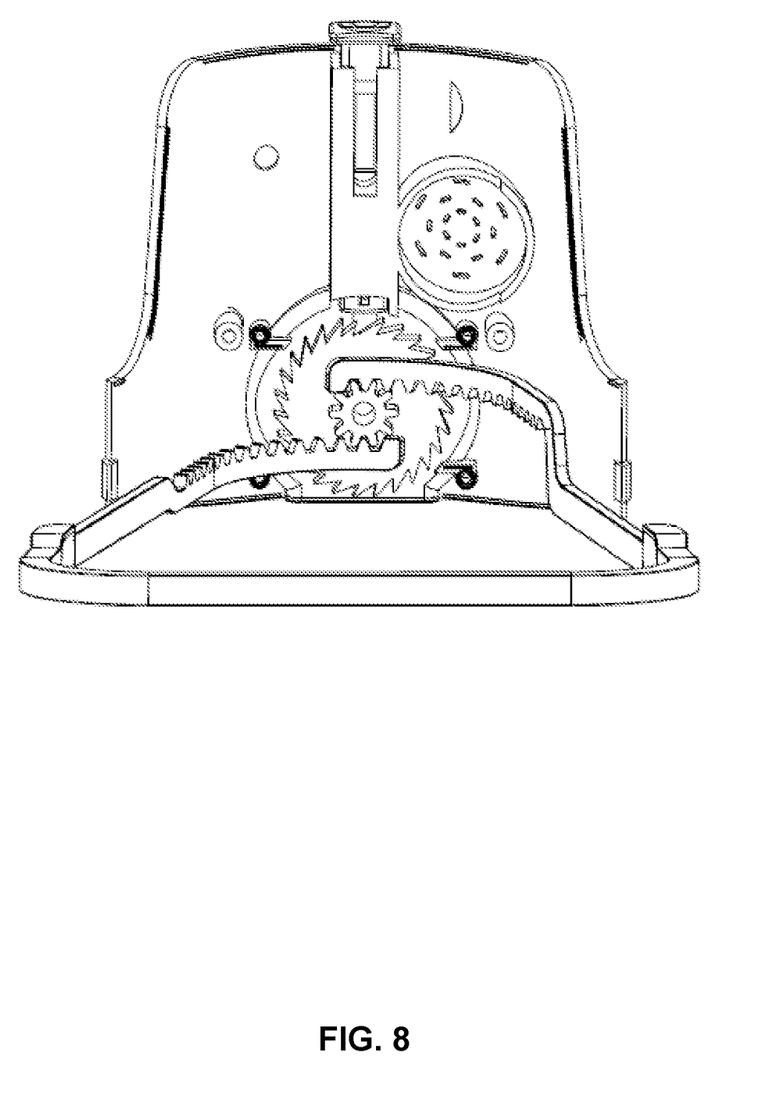
FIG. 8 is an internal structural view in the direction of FIG. 5 (a bottom base is removed).

The tension gear is a duplex gear, and unidirectional teeth are formed on a large gear 12-1 of the duplex gear. Toothed ends of the high and low racks stretch into the tag holder via holes formed in two sides of the tag holder and are engaged and matched with a small gear of the duplex gear (as can be seen from FIG. 8, the toothed ends of the high and low racks are engaged with the small gear from above and below, respectively). Four uprights 13-1 of a gear cover 13 are inserted into four holes in the surface base and are fixed to the surface base by ultrasonic welding; and a gap is formed between the gear cover and an inner side of the large gear to be used as a movement passage of the high and low racks (see e.g., FIG. 6).

Figure 1:
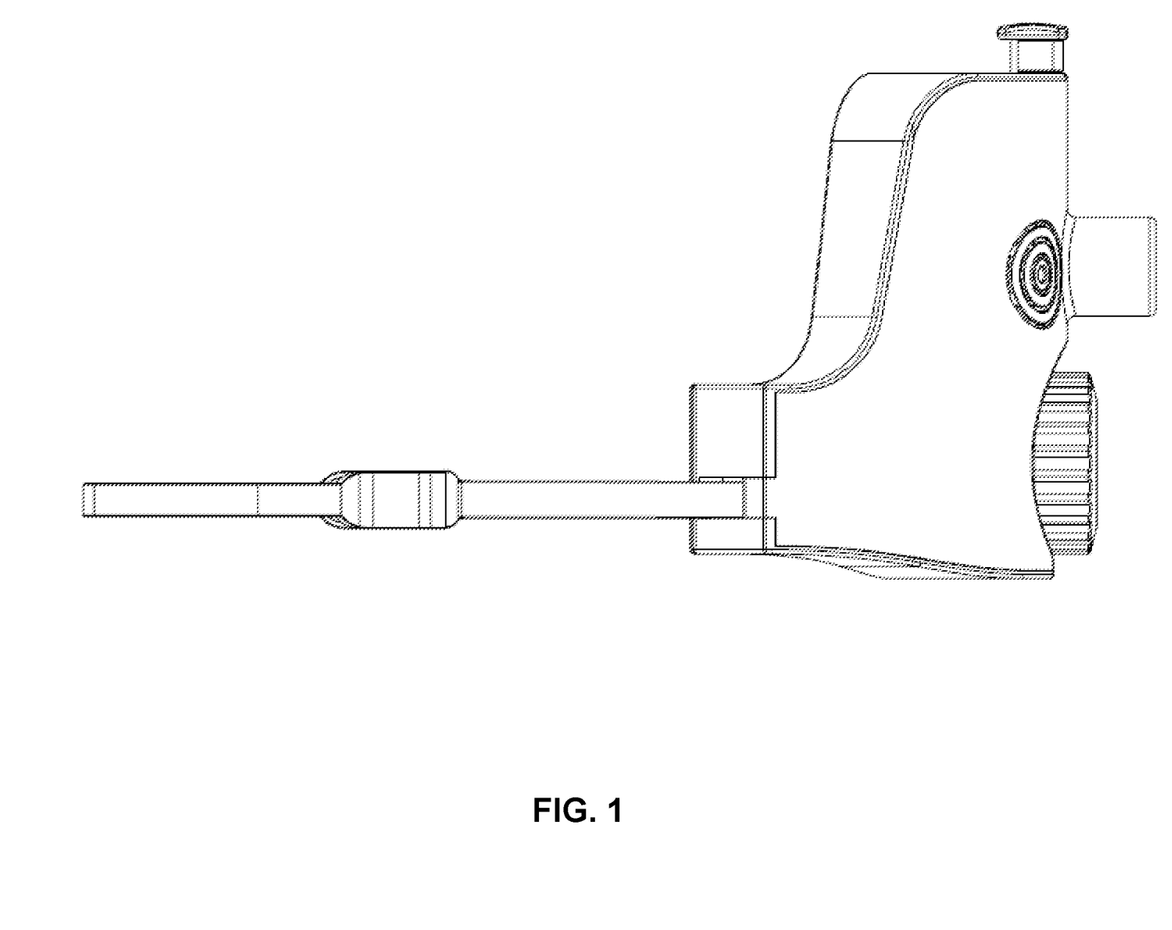
FIG. 1 is a front structural view of an embodiment of the invention.
Figure 2:
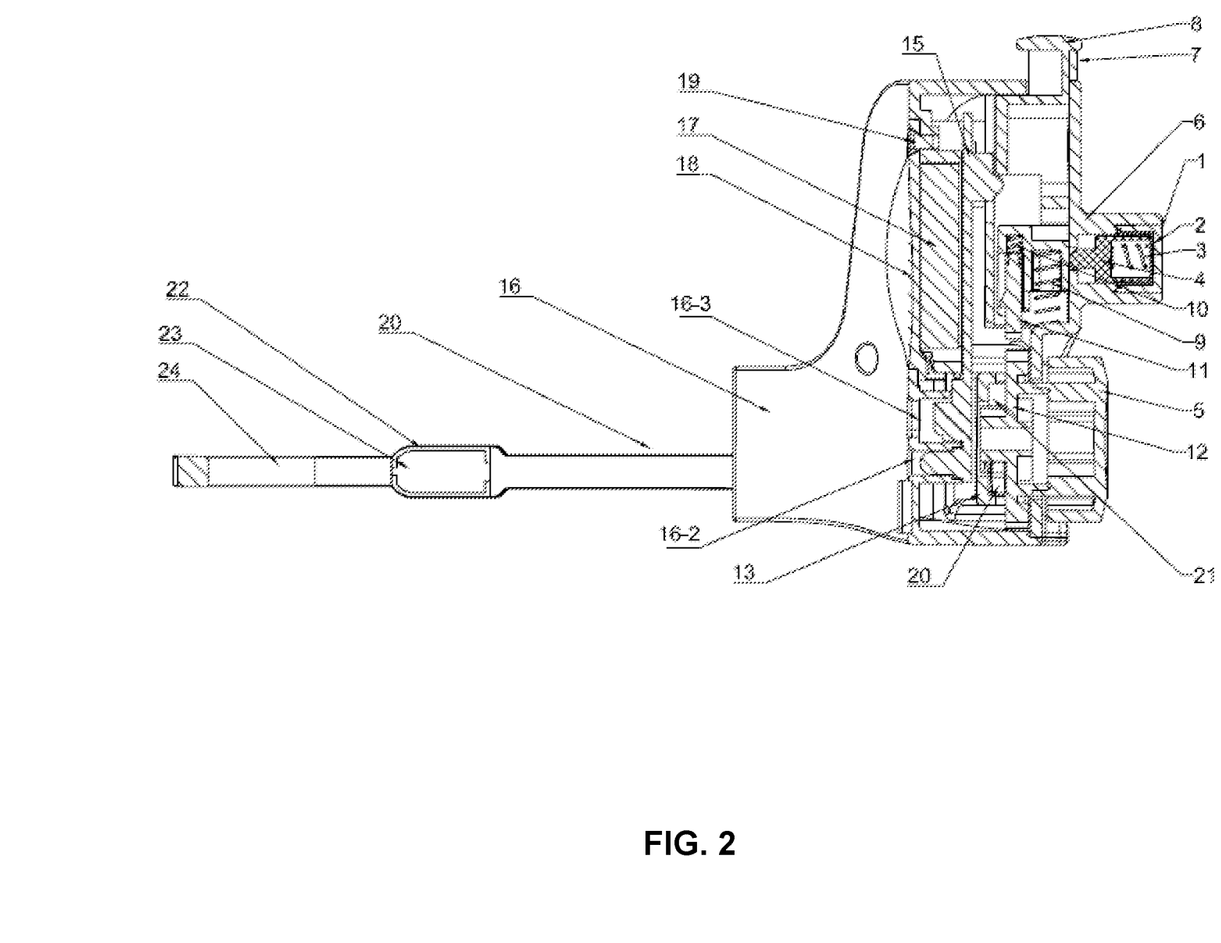
FIG. 2 is a sectional structural view of FIG. 2.
Figure 3:
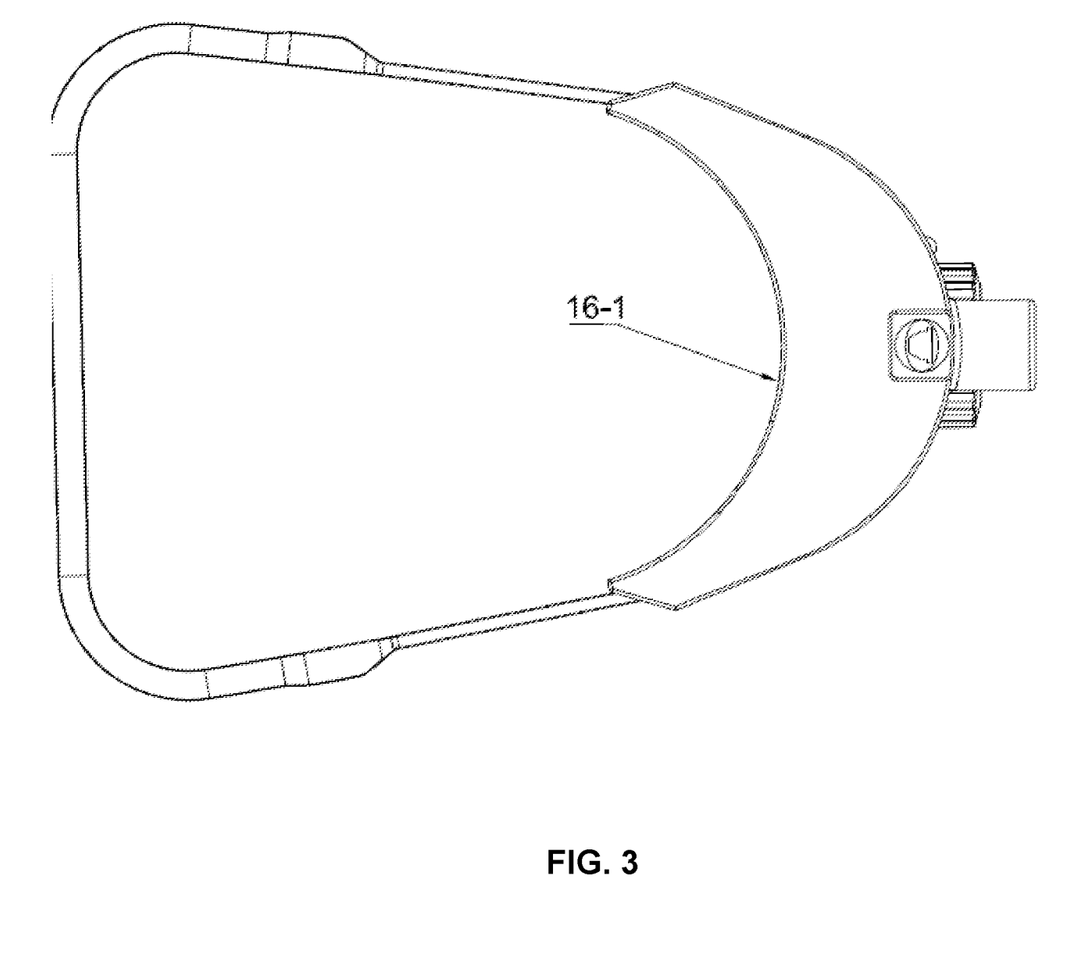
FIG. 3 is a top structural view of the embodiment of the invention.
Figure 4:
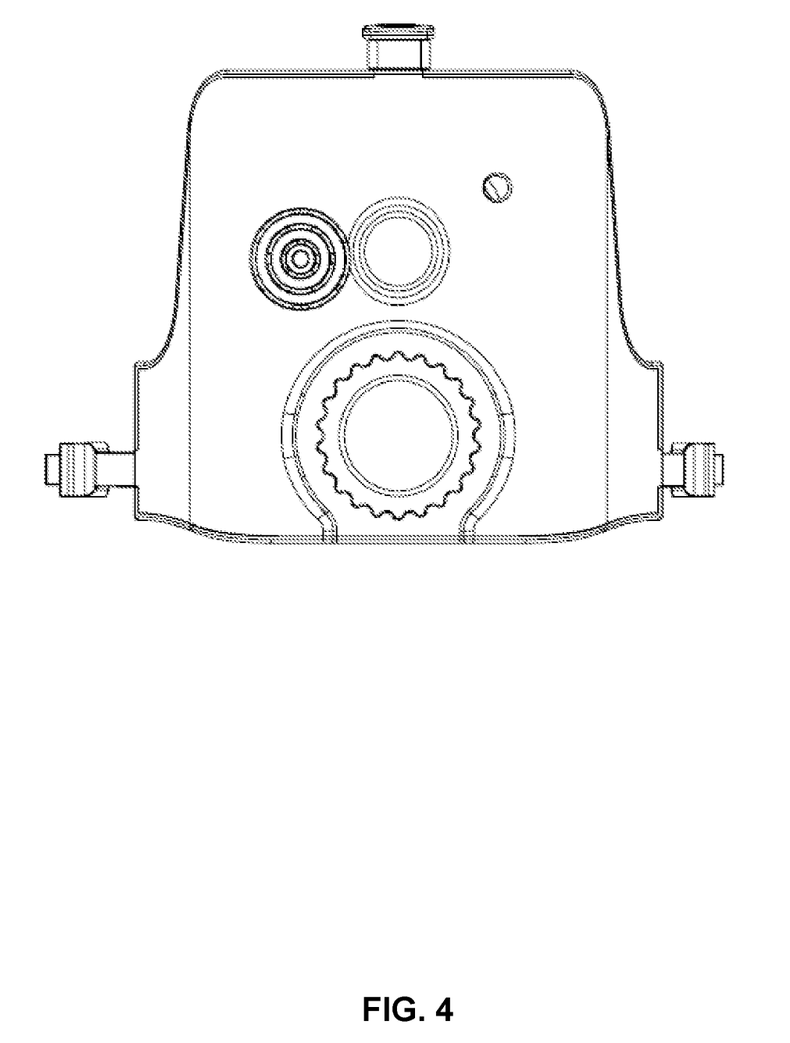
FIG. 4 is a right structural view of the embodiment of the invention.

In the bolt assembly, a lock tooth 11 is movably located in the tag holder, and a bottom end of the lock tooth is engaged with the large gear of the duplex gear; and a bolt 8 is movably located in the tag holder and applies a force to the lock tooth by means of a lock tooth spring 9, so that unidirectional teeth at the bottom end of the lock tooth abut against a toothed surface of the large gear. The moving direction of the lock tooth is parallel to the moving direction of the bolt (e.g., vertical direction in FIG. 2).

In the lock assembly, a cylinder is movably located in a cylinder seat of the tag holder (as can be seen from FIG. 2, the moving direction of the cylinder is perpendicular to the moving direction of the bolt), and a plug spring 3 applies a force to the cylinder to enable the cylinder to be matched with the bolt (e.g., a protrusion at the end of the cylinder may be inserted into a hole in the bolt to lock the bolt).

Furthermore, a concave surface 16-1 matched with a rear upper of the boot is arranged on a side, facing the boot, of the bottom base and fits the surface contour of the rear upper of the boot, so that the tag can be attached to the rear upper of the boot, thus improving the anti-theft performance (e.g., a layer of soft materials such as cloth may be laid on the concave surface to protect the surface of the boot).

Figure 5:
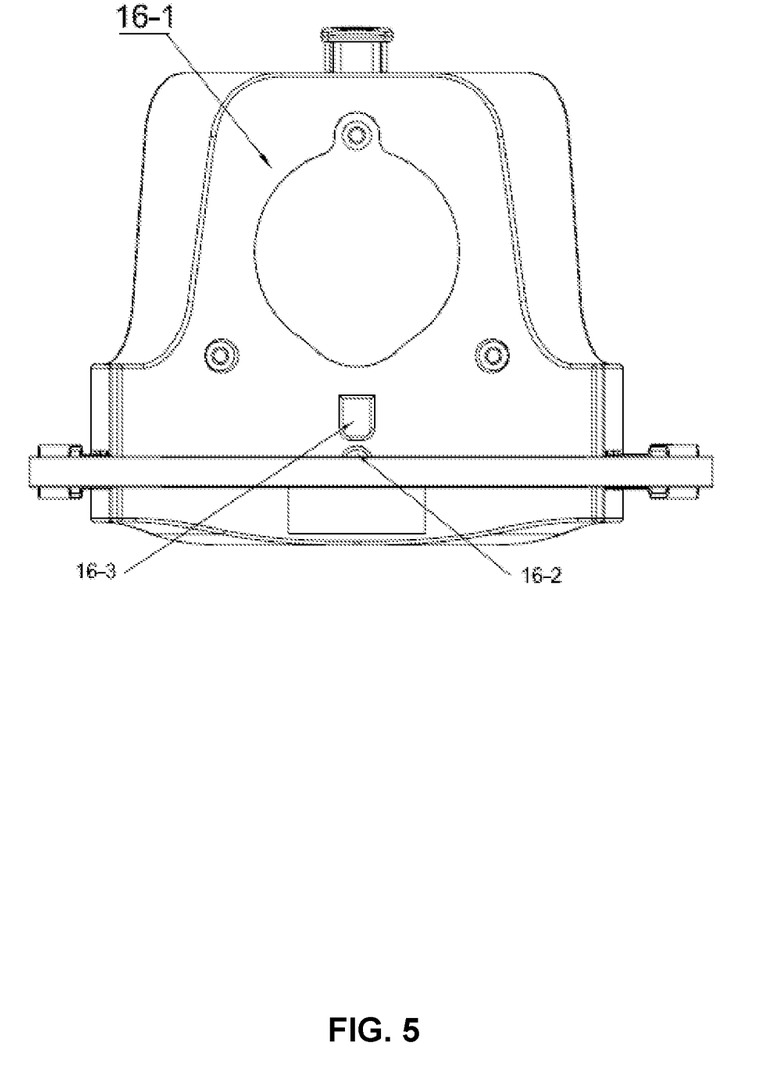
FIG. 5 is a left structural view of the embodiment of the invention.

A detection element for detecting whether or not the tag is separated from the boot is further arranged in the tag holder; a detection hole is formed in the concave surface to allow a detection light or a detection ray of the detection element to pass through. As can be seen from FIG. 2 and FIG. 5, a transmitting hole 16-2 and a receiving hole 16-3 are formed in the concave surface, and a transmitting element and a receiving elements (e.g., infrared optoelectronic switches) connected to the circuit board are mounted in the transmitting hole and the receiving hole, respectively; after being powered on, the transmitting element instantly transmits a signal to the boot, and the signal will be reflected back when reaching the boot. If the receiving element receives the signal, it indicates that the detection element functions normally. When the boot is beyond the protection scope of the detection element, the receiving element will instantly starts the sounder component to give an alarm in response to the signal interruption.

The circuit board is provided with a switch to be in contact fit with the bolt. As can be seen from FIG. 2, a contact switch 15-1 is mounted on the circuit board. When the tag is used, an anti-lock buckle 7 is released at first (e.g., the anti-lock buckle is clamped on the bolt and can prevent the bolt against a malfunction when the bolt is pressed during transportation), and the bolt is pressed to be locked by the cylinder and triggers the contact switch, so that a circuit of the detection element is started to enable the detection element to start to work.

Although the embodiments of the invention have been illustrated and described above, those ordinarily skilled in the art can make different variations, modifications, substitutions and transformations without departing from the principle and spirit of the invention. The scope of the invention is defined by the appended claims and their equivalents.

We claim:

1. A smart anti-theft tag for boots, comprising: a tag holder provided with a circuit board, a sounder component, a coil and a battery, a hoop assembly movably mounted on the tag holder to be tied on and connected to a heel of a boot, a bolt assembly movably located in the tag holder and used for unidirectional control of movement of the hoop assembly, and a lock assembly movably located in the tag holder and used to lock the bolt assembly in a moving state, wherein the hoop assembly comprises a high rack and a low rack which are configured correspondingly and provided with racks, a square cable fitting a contour of the heel of the boot and connected to the two racks through two connectors, and a tension gear movably located in the tag holder and engaged and matched with the two racks.

2. The smart anti-theft tag for boots according to claim 1, wherein the tension gear is a duplex gear located in the tag holder in a manner of rotating around an axis and connected to a knob; and toothed ends of the high and low racks stretch into the tag holder via holes formed in two sides of the tag holder and are simultaneously engaged with the duplex gear.

3. The smart anti-theft tag for boots according to claim 2, wherein the bolt assembly comprises a lock tooth movably located in the tag holder and having a bottom end engaged with a large gear of the duplex gear, and a bolt movably located in the tag holder and applying a force to the lock tooth by means of a lock tooth spring; and a moving direction of the lock tooth is parallel to a moving direction of the bolt.

4. The smart anti-theft tag for boots according to claim 3, wherein the lock assembly comprises a plug seat located on the tag holder, a cylinder movably located in the plug seat, and a plug spring located in the cylinder seat and applying a force to the cylinder to enable the cylinder to be matched with the bolt; and a moving direction of the cylinder is perpendicular to the moving direction of the bolt.

5. The smart anti-theft tag according to claim 4, wherein the tag holder comprises a bottom base and a surface base which are connected together and define a cavity, and a concave surface fitting a rear upper of the boot is arranged on a side, facing the boot, of the bottom base.

6. The smart anti-theft tag according to claim 5, wherein a detection element for detecting whether or not the tag is separated from the boot is further arranged in the tag holder, and a detection hole is formed in the concave surface to allow a detection light or a detection ray of the detection element to pass through.

7. The smart anti-theft tag according to claim 6, wherein a contact switch to be in contact fit with the bolt is arranged on the circuit board.

8. An anti-theft tag comprising:
a housing containing:
 a circuit board,
 a sounder component coupled to the circuit board,
 a coil coupled to the circuit board,
 a battery coupled to the circuit board, and
 a tension gear movably located in the housing;
a hoop assembly movably mounted on the housing for receiving a heel of a boot, wherein the hoop assembly comprises:
 a high rack;
 a low rack; and
 a cable having a square cross-section and connected to the high rack and the low rack through two connectors;
a bolt assembly movable within the housing to limit the hoop assembly to unidirectional movement;
a protrusion movable within the housing to lock the bolt assembly in a position wherein the hoop assembly is limited to unidirectional movement; and
a detection element arranged in the housing for detecting whether the anti-theft tag has been separated from the boot.

9. The anti-theft tag of claim 8, wherein the tension gear is engaged and matched with the high rack and the low rack.

10. An anti-theft tag comprising:
a housing containing:
 a circuit board,
 a sounder component coupled to the circuit board,
 a coil coupled to the circuit board,
 a battery coupled to the circuit board, and
 a tension gear mounted in the housing such that the tension gear can rotate about an axis;
a hoop assembly movably mounted on the housing for receiving a heel of a boot, wherein the hoop assembly comprises a high rack and a low rack, each having a toothed end; and
the toothed ends of the high rack and the low rack each stretch into the housing via holes formed in opposing of a tag holder;
a bolt assembly movable within the housing to limit the hoop assembly to unidirectional movement;
a protrusion movable within the housing to lock the bolt assembly in a position wherein the hoop assembly is limited to unidirectional movement; and
a detection element arranged in the housing for detecting whether the anti-theft tag has been separated from the boot.

11. An anti-theft tag comprising:
a housing containing:
 a circuit board,
 a sounder component coupled to the circuit board,
 a coil coupled to the circuit board, and
 a battery coupled to the circuit board;
a hoop assembly movably mounted on the housing for receiving a heel of a boot;
a bolt assembly movable within the housing to limit the hoop assembly to unidirectional movement, wherein the bolt assembly comprises:
 a duplex gear having a large gear and a small gear, and
 a lock tooth movably located in the housing and having a bottom end engaged with the large gear;
a bolt movably located in the housing and configured to apply a force to the lock tooth by means of a lock tooth spring;
a protrusion movable within the housing to lock the bolt assembly in a position wherein the hoop assembly is limited to unidirectional movement; and
a detection element arranged in the housing for detecting whether the anti-theft tag has been separated from the boot.

12. The anti-theft tag of claim 11, wherein a moving direction of the lock tooth is parallel to a moving direction of the bolt.

13. An anti-theft tag comprising:
a housing containing:
 a circuit board,
 a sounder component coupled to the circuit board,
 a coil coupled to the circuit board,
 a battery coupled to the circuit board, a bottom base and a surface base which are connected together and define a cavity, and
 wherein the bottom base has a concave surface arranged on a side of the bottom base facing the boot when the heel of the boot has been received in the hoop assembly;
a hoop assembly movably mounted on the housing for receiving a heel of a boot;
a bolt assembly movable within the housing to limit the hoop assembly to unidirectional movement;
a protrusion movable within the housing to lock the bolt assembly in a position wherein the hoop assembly is limited to unidirectional movement;
a detection element arranged in the housing for detecting whether the anti-theft tag has been separated from the boot, wherein the detection element is configured to emit a detection light or a detection ray; and
a detection hole is formed in the concave surface to allow the detection light or the detection ray of the detection element to pass through.

* * * * *